F. C. FIX.
INSOLE LIP TURNER.
APPLICATION FILED MAY 13, 1918.
1,380,098.
Patented May 31, 1921.
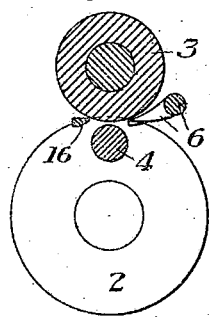
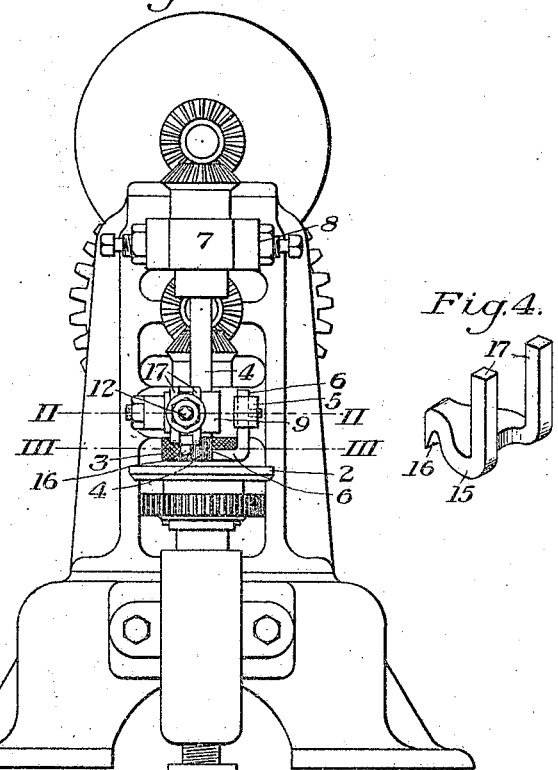
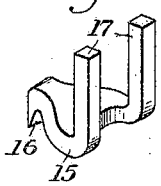
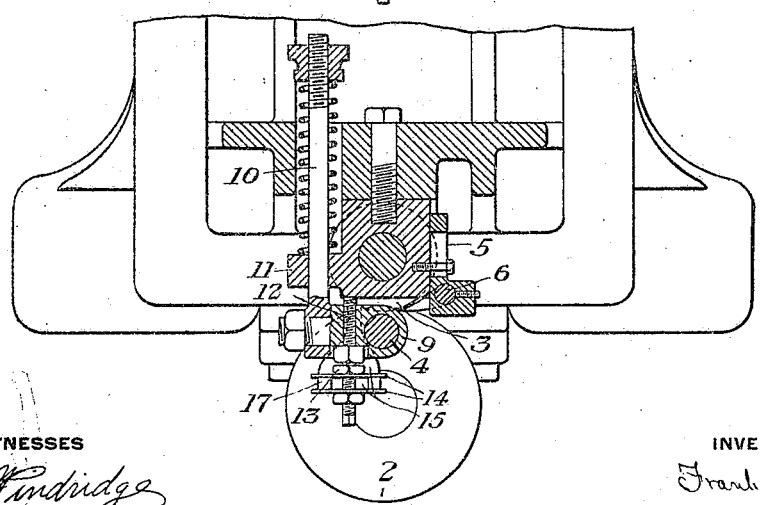

UNITED STATES PATENT OFFICE.

FRANK C. FIX, OF CINCINNATI, OHIO, ASSIGNOR TO ARMSTRONG CORK COMPANY, OF PITTSBURGH, PENNSYLVANIA, A CORPORATION OF PENNSYLVANIA.

INSOLE-LIP TURNER.

1,380,098.  Specification of Letters Patent.  Patented May 31, 1921.

Application filed May 13, 1918. Serial No. 234,042.

*To all whom it may concern:*

Be it known that I, FRANK C. FIX, a citizen of the United States, residing at Cincinnati, Hamilton county, Ohio, have invented a new and useful Improvement in Insole-Lip Turners, of which the following is a full, clear, and exact description, reference being had to the accompanying drawings, forming part of this specification, in which—

Figure 1 is a front view of one form of lip turner with my improvement attached.

Fig. 2 is a sectional view on the line II—II of Fig. 1.

Fig. 3 is a detail sectional view along the line III—III of Fig 1, and

Fig. 4 is a perspective view of the lip positioner.

This invention relates to an improvement in attachments for lip turning machines and is designed to provide an inexpensive and efficient device for positioning the lip after it has been turned by the turning mechanism.

As is well-known to those familiar with the art, composition insoles, having welt securing lips formed with tape, and in which the insole and lip are reinforced by means of a layer of duck secured to the lip and the top of the insole, have gone into extensive use in recent years.

The object of my invention is to provide an attachment for lip turners which is arranged to position the lip after it has been turned and prior to the placing of the reinforcing material on the top of the insole. I accomplish this by placing a lip positioning device beyond the lip turning and feeding mechanism to positively position the lip after it passes through the feeding mechanism.

In the drawings, I have shown one form of lip turning mechanism which comprises a rotary feed table 2, and a feed-wheel 3 above the table, the feed-wheel being rotatable about an axis parallel with the axis of the feed table. 4 designates a lip forming spindle which coacts with the feed-wheel 3 for pressing the two portions of the tape into contact to secure them to each other by the layer of cement thereon. 5 designates an adjustable bracket secured to the frame of the machine, and adjustably mounted therein is a stationary plow or lip turner 6 which is arranged to turn up the outer portion of the tape. The inner portion thereof is turned up by the end of the spindle 4. The various devices are rotated by mechanism well known to the art and need not be further described. The upper end of the spindle 4 is rotatably mounted in a bracket 7 pivotally mounted at 8 on the frame of the machine, while the lower end thereof is rotatably mounted in a bracket 9 carried on a spring-pressed plunger 10. This spring-pressed plunger is arranged to be guided in a lug 11 on the frame of the machine. Extending through the bracket 9 is a set-screw 12 which is arranged to be adjusted in order to position the spindle 4 with relation to the feed-wheel 3, so as to prevent the spindle from contacting with the feed-wheel when there is no insole in the machine. Adjustably mounted between nuts 13 and washers 14 on the screw 12 is a lip positioning device 15. This lip positioning device 15 is adapted to extend across a formed lip in contact with the top face thereof, and has a plow 16 which is arranged to engage the outside of the lip after it passes the feed-wheel 3 and the spindle 4 to position the lip. It is also provided with upwardly extending prongs 17 which straddle the screw 12 and are so arranged that the positioning device can readily be adjusted vertically as well as laterally between the washers 14. This device is also adapted to be adjusted to position the plow 16 relative to the wheel 3 by moving the nuts 13 along the screw 12.

It will readily be understood that the plow 16 may be of a different shape than that shown in the drawings to position the lip to meet various requirements. The plow, shown in the drawings, is so shaped and positioned that it will properly shape the entire upper portion of the lip due to the engagement with the top face and the outer face, and will turn the lip inwardly toward the center of the insole. I have found this operation to be the best for positioning the duck reinforce on the top and working it into the angle between the lip and the insole on both sides thereof, and at the same time properly position the lip for securing the welt thereto.

In the foregoing description I have merely referred to the positioning of the lip, but it will readily be understood that this device is also adapted to be used in connection with the tucking machine for tucking the reinforce in position on the lip and the insole, and in which this device would position the finished lip while the cement was still soft.

The advantages of my invention result from the provision of an adjustable positioning member in back of lip forming members to position the welt securing lip after it has passed through the lip forming mechanism.

I claim:

1. A machine of the character described, comprising a feed table, a feed means above the table, lip turning devices coöperating therewith for forming a lip on an insole, and means arranged to extend across the formed lip and engage the top face and outer side thereof for positioning the lip, substantially as described.

2. A machine of the character described, comprising a feed table, a feed means above the table, lip turning devices coöperating therewith for forming a lip on an insole, and vertically adjustable means arranged to extend across the formed lip and engage the top face and outer side thereof for positioning the lip, substantially as described.

3. A lip turner, comprising a rotary table, a feed wheel and lip turner, a lip turning spindle co-acting with the feed wheel, and an adjustable plow beyond the feed wheel for engaging the outside of the lip and positioning the same, substantially as described.

4. An insole lip-forming machine, comprising a support, rotary means for simultaneously forming the lip on the insole and for feeding the insole through the machine, and means beyond the lip-forming means and arranged to extend across the formed lip in contact with the top face thereof for positioning the upper edge thereof, substantially as described.

5. An insole forming machine, comprising rotary means for forming the lip and simultaneously feeding the insole through the machine, and an adjustable plow beyond the lip-forming and feeding means arranged to extend across the formed lip for engaging the outside of the lip and positioning the same, substantially as described.

6. A lip turner, comprising a rotary table, a feed means above the table, lip turner devices coöperating therewith for forming a lip on an insole, and means arranged to extend across the formed lip and engage the outer side thereof for positioning the lip, said means being vertically, horizontally and laterally adjustable, substantially as described.

7. An insole forming machine, comprising rotary means for forming the lip and simultaneously feeding the insole through the machine, and a vertically adjustable plow beyond the lip forming and feeding means and arranged to extend across the formed lip for engaging the outside of the lip and positioning the same, substantially as described.

In testimony whereof, I have hereunto set my hand.

FRANK C. FIX.